OVERDRAFT SIGNAL CONTROLLING DEVICES

Filed June 19, 1967 4 Sheets-Sheet 1

Nov. 4, 1969 R. R. GALLANT ET AL 3,476,312

OVERDRAFT SIGNAL CONTROLLING DEVICES

Filed June 19, 1967 4 Sheets-Sheet 3

OVERDRAFT SIGNAL CONTROLLING DEVICES

Filed June 19, 1967 4 Sheets-Sheet 4

3,476,312

OVERDRAFT SIGNAL CONTROLLING DEVICES

Reginald R. Gallant, Bristol, and Robert M. Loftus, Farmington, Conn., assignors to Olivetti Underwood Corporation, New York, N.Y., a corporation of Delaware Filed June 19, 1967, Ser. No. 647,100
Int. Cl. G06c *29/00*
U.S. Cl. 235—60 6 Claims

ABSTRACT OF THE DISCLOSURE

In a simply constructed adding and subtracting machine which is devoid of a fugitive one recovering mechanism, a register wheel of highest order will receive a negative carry operation when the register is overdrawn and such carry operation is utilized to operate an overdraft signal device. Under the control of a total key, the register wheels are subsequently cycle restored in a subtractive sense to zero position and further the signal device is restored responsively to normal condition without involvement of any tens transfer operation.

This invention relates particularly to adding machines of subtracting capability but which do not embody a fugitive one mechanism and in which the register wheels are cleared in response to the operation of a total key through subtractive rotation of the register wheels to their zero positions. Obviously, in such clearing operation the highest order wheel will not receive a carry operation. More particularly, the invention relates to an overdraft signal device which is actuated resultant to the register reaching an overdraft state and which in response to the operation of a total key is adapted to become restored automatically without any tens carry mechanism being functioning.

In a patent to Goldberg No. 1,989,313, an overdraft signal is rendered active by the highest order register wheel receiving a negative (overdraft) carry operation and is rendered inactive again conversely by being restored through a positive carry operation facilitated by well-known fugitive one reentry provision.

However, certain simply constructed adding machines lack fugitive one provision and, moreover, are constructed to additively roll a negative total out of a register. An example of such a machine is the patent to R. W. Pitman No. 3,000,561, dated Sept. 19, 1961. The invention pertains particularly to such kinds of machines and provides that an overdraft signal device becomes active as the register wheel becomes overdrawn but becomes restored in response to the institution of a total taking operation which rolls all register wheels in a subtracting sense to zero position. One feature of the invention provides that consequential to an amount indexing operation the total key becomes controlling to function as a subtraction instituting key and that when such key functions in such capacity the stated signal device must not be responsive to said key to restore the overdraft signal device.

By way of example the invention is shown applied to a machine of the kind shown in the patent to R. W. Pitman No. 3,000,561 dated Sept. 19, 1961, and insofar as the mechanism corresponds to said patent, the same reference characters are used for designating parts in the machine of the present invention.

Driving mechanism

Figure 3:
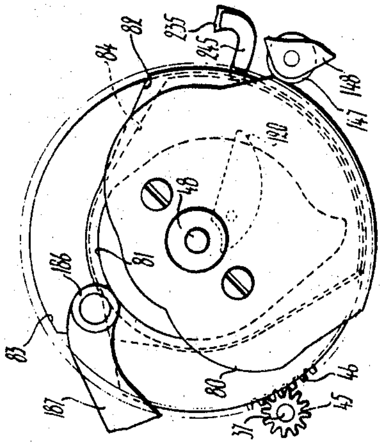
FIGURE 3 is a left side view of a cluster of cyclically actuatable cams including three register engagement controlling cams.
Figure 4:
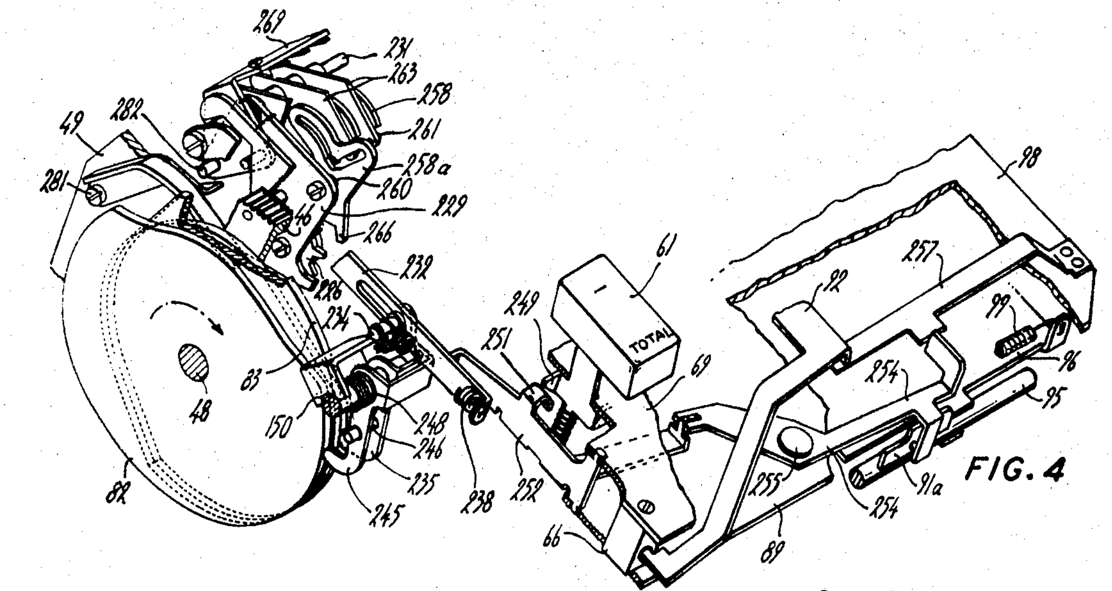
FIGURE 4 is a front perspective view showing the register engagement cams with two followers, and control devices for shifting one follower from one to another follower.
Figures 5, 11:
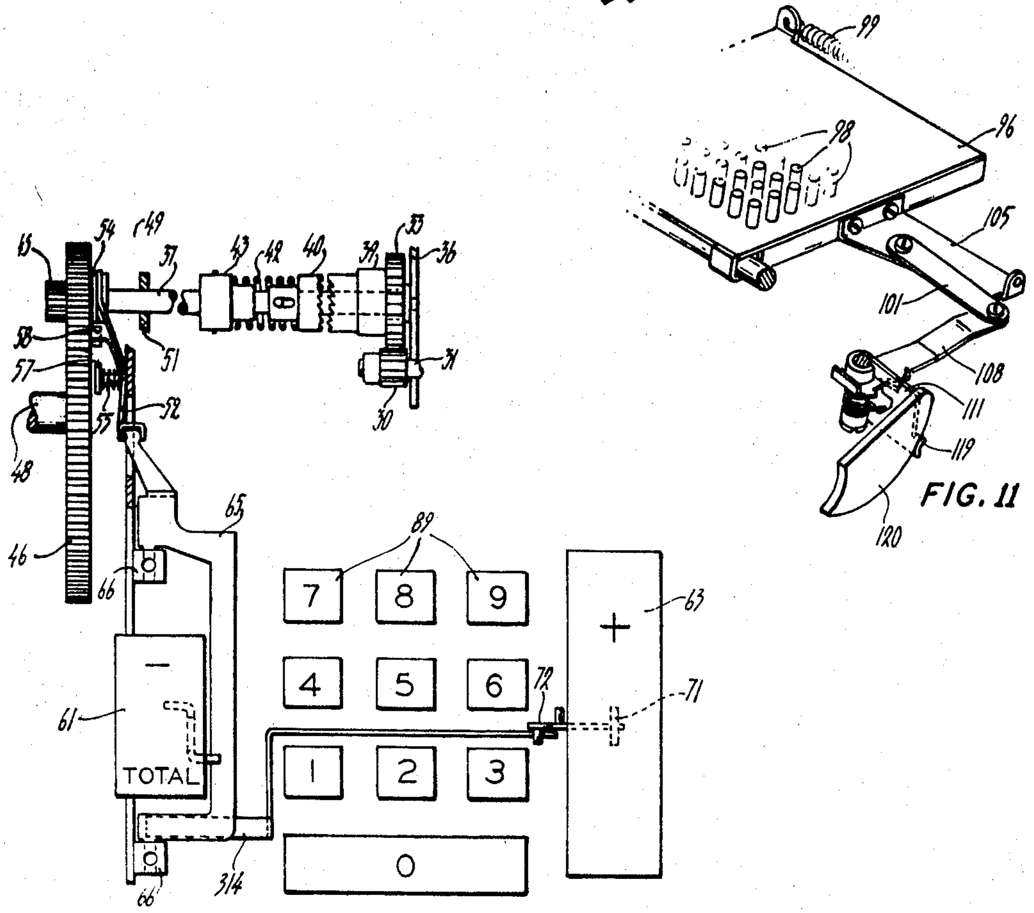
FIGURE 5 is a fragmentary plan view of a cycle control mechanism.
FIGURE 11 is a rear perspective view from the left side depicting a pin carriage restoring mechanism.

A large machine cycling gear 46, see FIGURES 3, 4 and 5, is adapted to receive a cyclic turn from a drive pinion 45 in response to any one of several function control keys, including a combination Add-Subtotal key 63 and a combination Subtraction-total key 61. So far as the invention is concerned no consideration need be given to the capability of the key 63 as a subtotal key and for that reason the mechanism which lends it that capability is not shown and the key 63 will simply be referred to as the add key. Said key 61 will act automatically as an add key whenever its operation follows an operation of a digit indexing key 86. Similarly, the key 61 will act as a subtract key whenever its operation follows an operation of a digit indexing key 86, and otherwise it will act as a total key.

Referring now to FIGURE 5, it will be seen that whenever the combination subtraction-total key is operated it will cause a cyclic turn of a large gear 46 which normally stands arrested by a stud 58 that is borne on a cycle trip plate 52. The latter under the urge of a compression spring 55, stands normally counterclockwise moved with its stud 58 residing in a notch on the right side of the gear 46. A drive pinion 45 for the gear is in constant mesh with the latter but such pinion along with its drive shaft 37 is normally held in a leftward position through the urge of the spring 55 on the plate 52, the latter by reaching into a grooved collar 54 on the shaft 37 being effective to hold such shaft in a leftward position so that a toothed clutch member 40 thereon stands disconnected from a motor-operable driven gear 33.

Operation of the key 61 results in a clockwise displacement of a bail 65 which has an arm reaching down into a fork of the plate 52. Thus when the key 61 is operated it will swing the plate 52 clockwise to withdraw the stud 58 and to shift the shaft 37 rightwardly for movement of the clutch member 40 to closed clutch position and therefore causes a cyclic turn of the gear 46. Also the add key 63, when operated, rocks the bail 65. It does so through operation of a lever 72 directly associated with the key and communicative with a link 78, the latter being operative on a downreaching arm of the bail 65. Each time the stud 58 becomes operated through operation of either of the keys 61 or 63 the cycle trip plate 52 is operated and due to the instituted cyclic turn of the gear 46 the clutch remains closed until the stud 58 can reenter the stated notch at the end of the turn.

Differential control mechanism and register

Figures 1, 2:
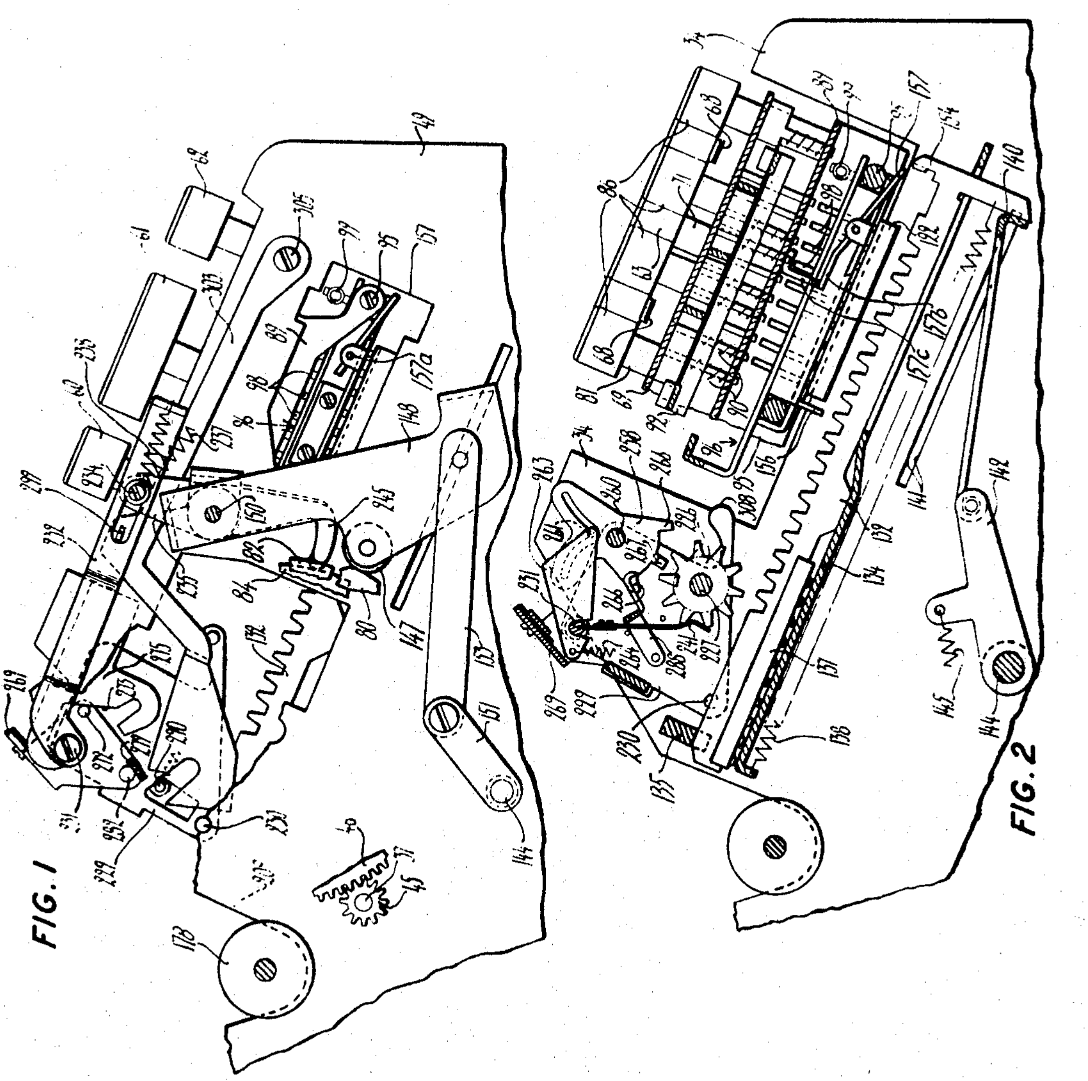
FIGURE 1 is a fragmentary left side view of the machine.
FIGURE 2 is a section through the machine looking from the left.

Referring now more particularly to FIGURE 2, it will be seen that the machine includes a register comprising a series of toothed wheels 226 rotatable on a shaft 227 which is borne on a register frame 229, the latter being swingable on studs 230 to engage the register wheels 226 with related driving racks 132 which bear types 137. Each said rack 132 is under the constant urge of a spring 138 so that they all are biased to become operated rearwardly, but a universal bar 140, common to all said racks 132, is normally in the position shown in FIGURE 2 to hold all the racks in the normal position shown, withdrawn forwardly of a printing platen 178.

The aforestated cycle gear 46 has cams 80, 81, 82 and 84, see FIGURES 1, 3 and 4, unitarily rotatable therewith. Cam 80, see FIGURES 1 and 3, through a follower roll 147 controls an arm 148 and in turn a train of parts 153, 151, 144, 142, see also FIGURE 2, leading to the stated universal bar 140. Through these parts the cam 80 normally holds the universal bar 140 in the FIGURE 2 position. Whenever the gear 46 receives a cyclic turn, the universal bar 140 will reciprocate, first rearwardly to allow the racks 132 to be spring drawn rearwardly and then forwardly to restore them.

Figure 6:
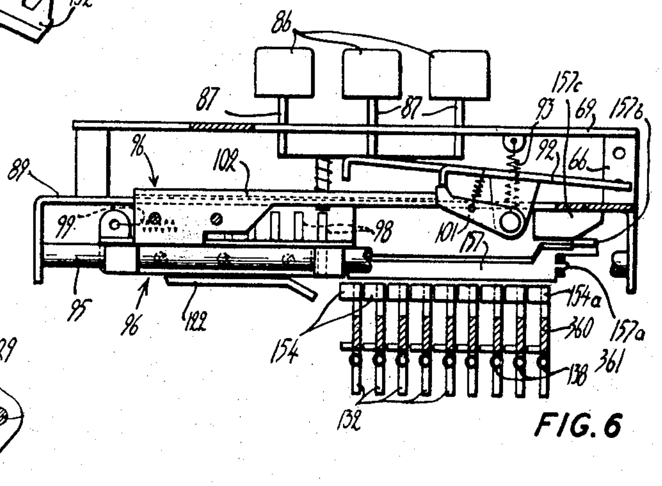
FIGURE 6 is a rear view of a digit indexing mechanism, including an ordinal escapement mechanism.

Reference is now made to FIGURE 6 which is a rear sectional view depicting a pin carriage 96 in a normal position. Such position as seen from the front is one digit space to the right of an upreaching tail 154 on the lowest order rack 132. The pin carriage 96 has a rectangular bed of digit pins 98, there being a plurality of rows of these pins fore and aft extending, and the carriage, considered from the front, being urged to advance to the left denominationally under the power of a spring 99, but being normally restrained by an escapement mechanism comprising a dog 101 engaged in a notched rack 102, the latter being movable bodily with the pin carriage 96. A series of digit keys 86 are depressibly supported on two parallel plates 69, 89 and include each a downreaching pin setting leg. Such legs are disposed in a single fore-and-aft row for setting action upon the different rows of index pins 98, denomination after denomination, as the pin carriage 96 escapes one denominational space after each digit key depression. An escapement step results each time an escapement bail 92 becomes actuated by a depression of a digit key 86. Said bail 92 includes a tooth thereon to operate the escapement dog 101 and cause an escapement step of the pin carriage 96.

Figure 7:
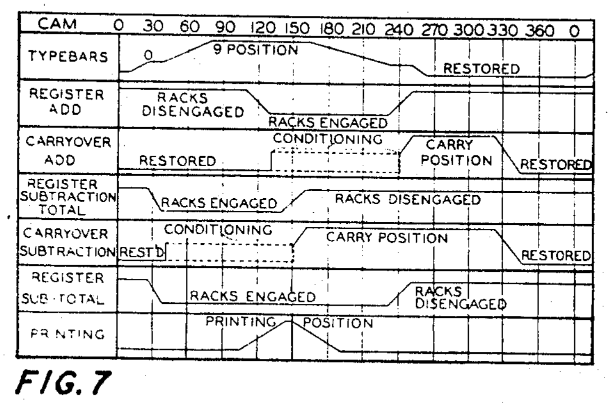
FIGURE 7 is a chart showing the timing of operations in differently controlled machine cycles.

It will now be seen that after an amount is indexed there are pins 98 located discretely in the operating paths of the rack bars 132 to restrict them for measured rearward movement in an add or a subtract cycle to bring the appropriate digit type to a printing position opposite the platen 178. Following the measured rearward movement the universal bar 140 will again effect the restoration of the rack bars 132 to normal position. As will become evident later herein, amounts in subtracting cycles become run out of the register in an early cycle portion whereas in adding cycles amounts become run into the register in a later cycle portion, see FIGURE 7.

The machine includes a usual provision, see FIGURES 2 and 6, whereby such rack bars 132 for which no index pin 98 has been set, are blocked against rearward movement by a stop plate 157. Such stop plate 157 is swingably supported on the pin carriage 96, as at **157*a*, and is normally held out of the operating range of the tails 154 of the rack bars 132, see FIGURE 6. To this end the plate 157 has a rearwardly reaching finger 157*b* which incidental to the restoration of the pin carriage through engagement with a stationary cam element 157*c*, becomes restored as the pin carriage arrives in the lowest order digit position, as seen in FIGURE 6. After a first pin setting operation the pin carriage 96 will have escaped one space and in doing so the finger 157*b* on the plate will move off the edge of the cam 157*c* so that then the forward edge of the plate 157 will obstruct all but the lowermost order of rack bars 132. Following further key operations, further rack bars 132** will sequentially become freed by the plate for rearward movement.

The pin carriage 96 whenever it has been stepped from its lowest denominational position is automatically restored to such position in the course of the next machine cycle. This is done through a cam 120 on the cyclic gear 46 which near the end of each cycle, see FIGURE 11, is operative upon an arm to operate another arm 108 which by a link 107 is adapted to impart a restoring motion to the pin carriage.

FIGURE 4 shows a cam follower means comprising a follower 235 and a follower 245, the follower 245 being normally in operative registration with the cam 82 and the other follower 235 being always in operative registration with the cam 84. Both the followers are of bail form and pivotally borne on a fixed stud 150. The follower 245 is axially shiftable rightwardly to register with the cam 83 instead of with the cam 82. The follower 245 is axially immovable. The follower 235 has a pin 246 reaching into a hole of the follower 245 so that the two followers are constrained to move pivotally together. A link 232 between the bail of the follower 235 and the register frame 229 serves to transmit engaging and disengaging movements to said register frame, the timing of which movements depends on the control which the cams 82, 83 and 84 are conjointly allowed to exercise over the follower means 235, 245.

The normal leftward axial position of the cam follower 245, see FIGURE 4, arises from the fact that a cam element **91*a* on the pin carriage 94, is normally in the rightwardly, restored position, effective to keep a lever 254 clockwise swung, as shown, wherefore in turn an arm being part of a lever 252 is normally held moved counterclockwise so as to hold the follower 245 against the pressure of a spring 248 in its normal, leftward position. When so held it is in registration with the cam 82. In the condition stated, a flexible latch leaf 257 is in an upwardly snapped position to hold the lever 254 counterclockwise moved until a first index key is operated. Such latched position of the lever 254 is normal and is attained resultant to each restoration of the pin carriage 96 when a cam member 91*a* on the pin carriage 91 acts clockwise on the lever 254. Consequently the leftward position of the arm 252 shown in FIGURE 4 is normal wherein its rear tongue holds the bail of the follower 245 in its leftward position against the pressure of the spring 248 so that such follower is cooperative with the cam 82**.

Alignment of the follower 245 with the cam 83 results automatically under the urge of the spring 248 when responsive to a first digit key operation the escapement operating bail is operated and depresses the latch leaf 254 out of the way of the lever 254 and moreover the pin carriage takes the initial step movement to line up the leftmost pin row with the rack 132 of lowest order. If an amount is to be added or subtracted, the operator first depresses appropriate digit keys. At the first such digit key depression the universal bar 92 underlying the digit keys is operated and depresses the latch leaf 257. Consequently the lever 254 will snap counterclockwise under the influence of the spring 248 which is associated with the follower 245 and the lever 252 will snap clockwise. This places the follower 245 in its rightward position wherein it is in operative alignment with the cam 83 and which alignment predetermines an engagement and disengagement of the register for running an amount additively into the register 226 in a cycle phase from 130 to 230 degrees of operation of the cyclic gear 46. If in the condition so prevailing the add key 63 is depressed the indexed amount will be run additively into the register 226 as the rack bars restore.

However, for subtraction and for total taking operation the follower 245 needs to be rightwardly positioned because for these operations the register needs to be engaged and disengaged respectively at 40 and 140 degrees of operation of the cyclic gear. For that reason the stem of the key 61 is provided with a cam finger 249 which by coacting with a cam face on the arm 252 is adapted by move the latter counterclockwise to the same position as seen in FIGURE 4. The follower means comprising the followers 245, 235, through the latter follower is operative on a link 232 to rock the register wheels 226 by its supporting frame 34 into engagement with the racks 132. Due to the conditioning of the follower means 245, 235 as afforded by the shifting of the follower 245, and the forms of the cams 82 and 84, the racks 132 during subtractions and total taking operations (see operational diagram FIGURE 7) become engaged and disengaged by the register respectively at 40 and 140 degrees of operation of the cyclic gear. On the other hand during adding operations the cams 83 and 84 are controlling so that the register racks 132 become engaged and disengaged respectively at 130 and 230 degrees of operation of the cyclic gear, that is the racks 132 roll amounts into the register when they return.

Total taking operation

Figure 10:
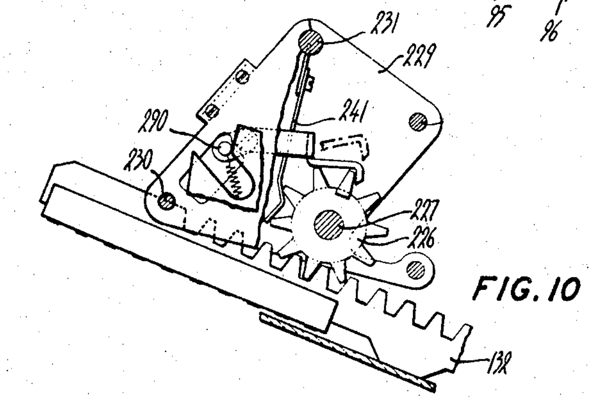
FIGURE 10 shows a bail moved to a position to stop the register wheels in their zero positions in a total taking cycle.

During total taking cycles the register will be in mesh with the rack bars 132 during rearward movement of the universal bar 140 after first in the movement of the cyclic gear 46 the bars are moved to place the zero type at the platen. Always a total taking operation can be instituted only while the pin carriage stands restored rightwardly, wherefore the plate 157*a* stands raised above the tails 154 of the rack bars 132 and thus all such bars become capable of rearward movement. After the register wheels 226 are in mesh, the bars 132 roll the various wheels subtractively to their zero positions as the cyclic gear moves from 40 to 140 degrees position. This is so whether the wheels contain a positive amount or contain an overdraft. Such substrative roll-out is accomplished under the control of a normally ineffectively positioned stop bail 288 for the register wheels. This stop bail has stop fingers for engagement by the wide tens carry teeth as the wheels are rotated by the rack bars. Normally, under the urge of a spring 291 the bail 288 is in an idle position on the register frame indicated in dot and dash lines in FIGURE 10. For causing the bail 288 to move into effective position an arm 303, see FIGURES 1 and 10, is provided. Such arm 303 is normally in the raised normal position seen in FIGURE 1 but by means, not shown, is caused to stand in the lowered position seen in FIGURE 10 whenever the pin carriage 96 has been returned. Therefore, if in such lowered position of the arm 303 the register frame 229 is lowered in a total taking cycle, the bail 288 by a pin 290 thereon colliding with the arm 303 will become operated for effecting arrests of the wheels 226 by cooperation with its wide tens carry teeth. At 140 degrees position the register becomes disengaged and about the same time the platen strikes the positioned type bars which latter will print the total.

Figure 9:
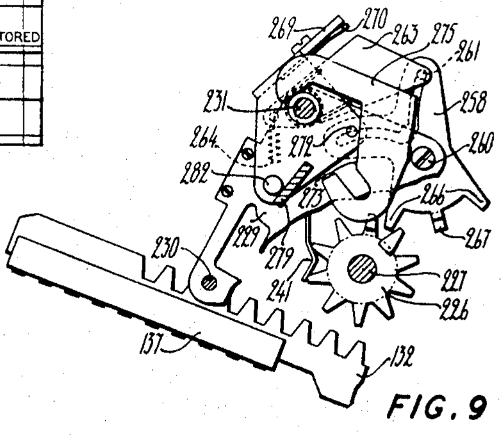
FIGURE 9 shows the tens transfer mechanism at a point in the cycle where a tens transfer arm has just effected a subtractive transfer.
Figure 8:
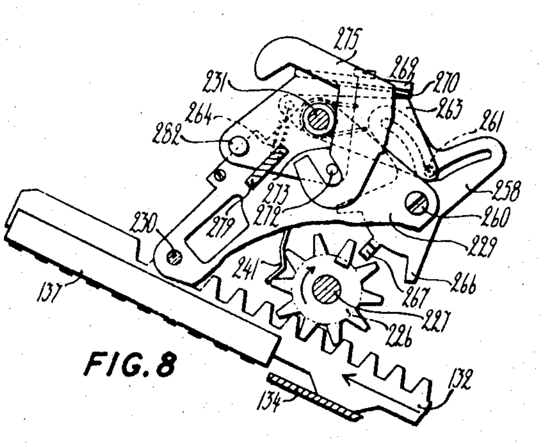
FIGURE 8 shows a tens transfer mechanism prior to a subtractive transfer.

Tens carry mechanism (FIGS. 8 and 9)

For running amounts subtractively and additively into the register wheels, the racks move respectively rearwardly and forwardly. Whenever any register wheel 226 passes from a 9 representing to a 0 position during addition, or from 0 to 9 during subtraction, the wheel of next higher denominational order is moved one step in the corresponding rotative direction, signifying thereby a tens transfer additively or subtractively as the case may be. A tens transfer mechanism for this purpose comprises a plurality of transfer arms 258 one aligned with each register wheel 226. Such arms are pivotally carried on a shaft in the register frame 229 and each is normally held in a normal position by a pin 261 in a detent notch provided therein. The pins are on the forward ends of arms 263 which are pivotally provided on a rod 231 in the register frame 229. A spring 264 urges each arm 263 counterclockwise. The lower end of each transfer arm 258 is formed with teeth 266, one in front and one in rear of the register wheel with which it is aligned. A tooth 267 on each arm 258 extends to the right between the teeth 266 into the path of the wide tooth of the next higher order register wheel. The detent notch 262 of each arm 258 is formed at the juncture of the branches of a V-shaped slot 258, see FIGURE 8. When any tooth 267 is struck by a wide tooth of a register wheel 226, as during rotation of the wheel subtractively from FIGURE 8 position, the arm 258 will be rocked a little counterclockwise so that the pin 261 will be caught in the lower front part of the V slot. During addition the cooperation of the wide wheel tooth and the tooth 267 will be the same except directionally opposite, that is in additive direction. For the time being the arms 258 are held from rising in the branch of the V slot, by a universal bar 269 which overlies all the levers 263. The universal bar 269 includes two depending end ears by which it is pivoted on rod 231. A torsion spring 271 constantly urges the universal bar 269 counterclockwise, see FIGURES 9 and 10. The left hand ear of the bar 269 has a pin 272 which in FIGURE 9 rests against a cam edge 273 of a fixed plate 275. As the register frame is rocked by the link 232 to engage the register wheels, pin 272 is moved along edge 273 to move the bar 269 down for the time being to prevent levers 263 from rising above their detented positions. As the register frame 229 is restored to its normal position after an entry, additive or subtractive, the bar 269 remains stationary on the register frame until pin 272 moves out of the portion 273 which is concentric with the register frame pivot 281. During further restoration, the bar 269 is released to move to its original position, see FIGURES 1 and 9. It is at such time that those carry levers 263 which have their pins in the bottom portion of either slot-branch of the carry arm 258 will become spring rocked to cause such arms to execute carry operations, respectively, additively or subtractively depending on whether the pin 261 was moved into the rear or front branch of the slot. Also at such time, tens carry operations to consecutively higher orders are executed, wherever required.

At the end of the cyclic turn of the gear 46 the bar 269 is momentarily operated to restore any lever 263 and arm 258 which has been involved for effecting a tens carry operation. This is evident from FIGURE 4, wherein an arm 276 is shown pivoted on a stationary stud 281. Such arm has a cam face 278 engageable by a pin on the gear, not shown, near the end of each cycle to operate the arm 276 momentarily upwardly. The arm includes an ear 279 which during the momentary operation of the arm 276 acts on the bar 269 to restore it transitorily thereby to restore the carry arms 258 to their normally idle, detented positions shown in FIGURE 2.

It will now be seen that tens carry operations may be effected in additive or subtractive sense and that if an amount is subtracted which is greater than the amount contained in the register, the latter becomes overdrawn, that is the highest order wheel will move from 0 to 9 position.

The machine at hand is unable to rotate a true negative total out of the register in a total taking operation because the register wheels are merely turned subtractively to their 0 positions. The operator may take one or another course of action to eliminate an overdraft condition. One such course is simply to add back a given amount. The other course of action is to bring the register to zero condition through causing a machine clearing operation under the control of the total key 61 which will simply rotate all register wheels in subtractive direction to their zero positions. Either of such courses of action are feasible in the machine of Pitman, or similarly constituted machines, but no overdraft warning or signalling devices suitable for such machines have heretofore been devised.

Overdraft signalling device

Figures 12, 13, 14, 15:
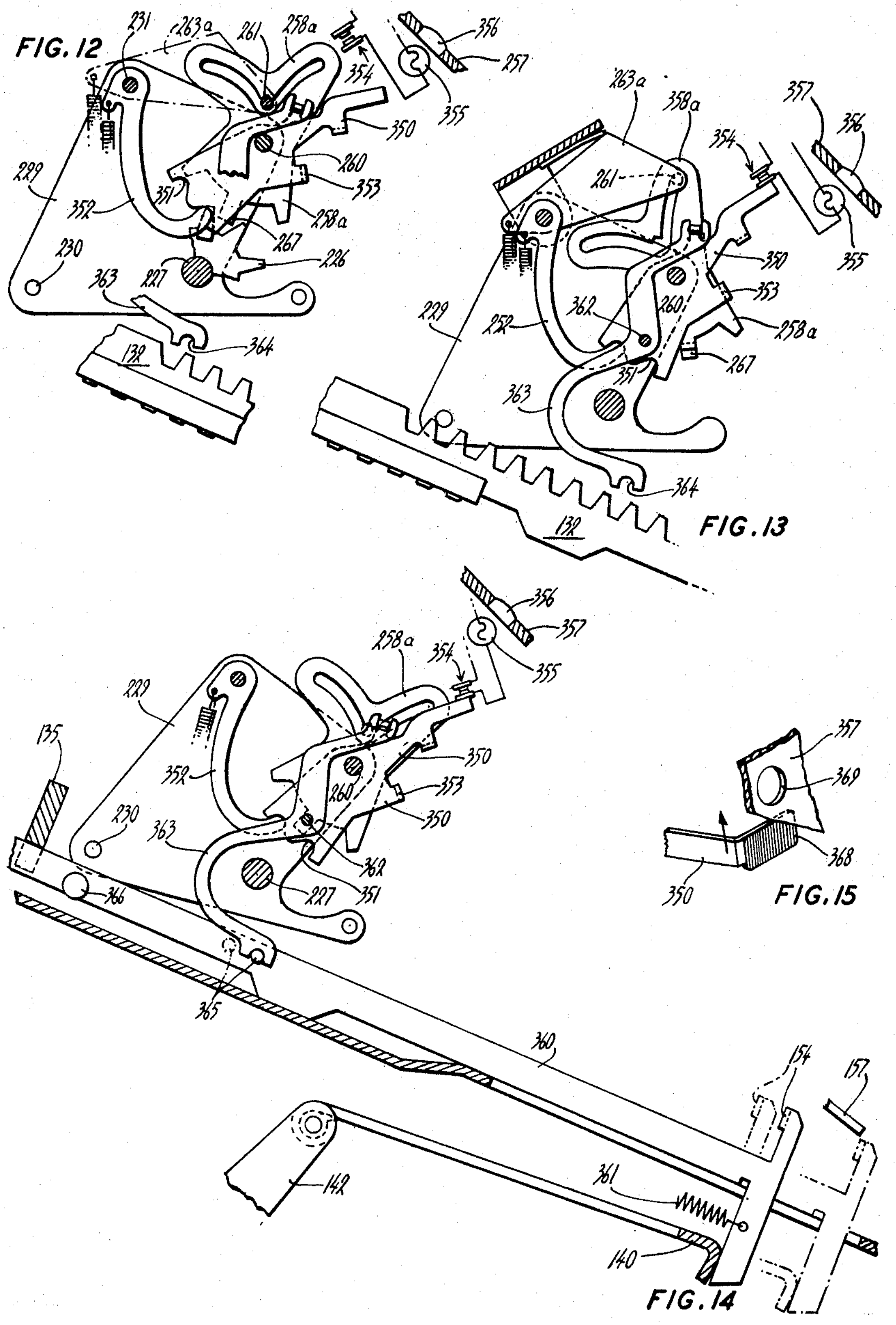
FIGURE 12 is a left hand side view of the overdraft signal light control mechanism in its normal condition.
FIGURE 13 shows the mechanism of FIGURE 12 operated in the course of a subtraction cycle.
FIGURE 14 shows the signal mechanism just before it becomes restored in a total taking cycle, and, finally.
FIGURE 15 illustrates a modified signal exhibiting means involving a semaphore flag instead of a signal light.

An overdraft signal control member or lever 350 has normally the position seen in FIGURE 12, such lever 350 being pivotally carried on the same rod 260 on which the carry arms 250 are supported. The signal control lever 350 has two detent notches 351 in the forward one of which there normally rests a detent arm 352 which is pivoted on the rod 231. Moreover, pivoted on the rod 260 is an element **258*a* which is identical to the before-described transfer arms 258 and likewise has a tooth 267. Said element 258*a* has normally the position seen in FIGURE 12 and like the tens carry arms 258, has a detent notch between the V-shaped slot branches wherein a pin of an arm 263*a*** normally rests upwardly.

The wheel 226 related to the highest order rack bar 132 has a single wide tooth just like the carry teeth on the other register wheels and such tooth is in the position shown in FIGURE 12 if the wheel is in zero representing position. When the highest order wheel through a carry operation in a subtractive sense is turned from 0 to 9 position during a subtraction cycle, its wide tooth will actuate the stated element **258*a* counterclockwise a little and with the assistance of its related spring-pressed arm 263 it will arrive in the position seen in FIGURE 13. In turn the element will operate the signal control member 350 through an ear 353 counterclockwise to the detented FIGURE 13 position. The signal control lever 350 thereby closes an electric switch 354 supported on the register frame 229 and in circuit with an overdraft signal light 355. Said signal light is situated behind a window 356 in a machine cover indicated at 257. Flexible wires permit free movement of the switch 254** along with said register frame while the light is remaining stationary.

The lighting of the signal light 355 advises the operator that either one of said stated two courses of action may be taken. If the stated add-back course of action is taken the operator indexes the number which was last subtracted and depresses the add key 63. In the resultant cycle, carry operations will be transmitted via the carry arms 258 so that the highest order wheel 226 will receive in a usual manner a counterclockwise tooth step and through its wide tooth thereon will operate the element **258*a* clockwise, and in turn through an ear will operate the signal control member 350** clockwise to the normal position seen in FIGURE 12.

The other course of action involves the taking of a total taking operation under the control of the total taking key 61 but such total taking operations merely roll the register wheels substractively to their 0 positions and never do involve any carry operations, negative or positive. Provision is made so that if the key 61 is operated while the indexing carriage 96 is in restored position, the signal control lever 350 will become automatically restored and in turn the signal light switch 354 will open. To this end, see FIGURE 14, there is provided at the left side of the set of rack bars 132 a toothless slide 360 which in the total taking cycle under control of the universal bar 140 is urged to move rearwardly by the power of a spring 361 until stopped by a pin 3 thereon engaging a stop 135. When the slide 360 reaches the full line position seen in FIGURE 14, it will pause momentarily and at such time the register engages the racks 132. On the left wall of the register frame 229 there is pivotally supported at 362 a lever 363 which at its upper end has a forked connection with an ear of the signal control lever 350 and which at its lower end has a notch 364. While the engagement of the register takes place, the said lever 363 becomes coupled by its notch 364 to a pin 365 on the slide 360. As the universal bar resumes its movement the slide moves a short distance further until a stop 366 thereon strikes a bar 135 and during such movement the lever 363 restores the signal control lever 350. The register disengages at 150 degrees operation of the cyclic gear 46 so that the lever 363 becomes separated from the slide 360.

The slide 360 is always blocked against operation if the operator effects an indexing operation. Such blocking is done by the plate 157 (see FIGURES 2 and 6), which incidental to any indexing operation drops to blocking position in front of a tail **154*a* on the slide, wherefore whenever the key 61 is operated to function as a subtraction key, the slide 360 will be blocked against operation and the signal control lever 350** will not become restored.

Instead of controlling a signal light 355, see FIGURE 15, the signal control lever 350 may have thereon a bright colored semaphore flag 368 moving in front of a window indicated at 369.

The equipping of the subject machine with the featured overdraft signalling device is of great value particularly in carrying out division problems by the well-known process of repeated subtraction of the divisor. In such method the device of the invention functions to advise the operator when in each step of such division process the divisor becomes subtracted once too often and needs to be added once back again. Furthermore, when it is decided that the product has been developed far enough and the register then contains a negative value, the depression of the total key will cause the restoration of the signal device. It will be observed that under such condition the restoration of the signal device results independently of the carry mechanism.

It is also evident that whenever the operator prepares to undertake any calculation and the signal device stands in an operated position the negative balance in the machine needs to be eliminated by a total taking operation to normalize the machine and therewith to restore the signal device.

What is claimed is:

1. In an adding machine having a multi-wheel register, a tens carry mechanism associated with said register and capable of operation to operate the highest order register wheel from "0" to "9" position if in a subtracting operation the register becomes overdrawn, and having also an amount indexing mechanism, and in which machine indexed amounts are adapted to be run in an adding direction into said register during an adding phase and wherein indexed amounts are adapted to be run in a subtracting direction out of the register during a subtraction phase and wherein further amounts contained in the register, whether of positive or negative nature, are adapted to be run out of the register in said subtraction direction in said subtraction phase by rotation of the wheels to zero positions, the combination therein with said indexing mechanism and said highest order wheel, (a) of a total key, (b) means controlled by said key if said indexing mechanism has precedingly not been operated, to subtract the amount contained in the register, whether positive or negative, in a subtractive sense, placing said register thereby in zero position, (c) an overdraft signal control member operable to an overdraft signifying position by rotation of said highest order wheel from "0" to "9" position, (d) and restoring means for said member adapted to respond to said key only if said indexing mechanism is unindexed, to cause a restoration of said signal control device, ($d^1$) said last introduced means including means controlled by said indexing means, if operated, to incapacitate said restoring means.

2. The invention set forth in claim 1, said restoring means including reciprocally actuated means which becomes incapacitated through operation of said indexing means.

3. The invention set forth in claim 2, including an overdraft warning light which is normally inactive, and an electric switch for said light closable and openable respectively by the operation and the restoration of said member.

4. In an adding machine having a machine cycling means, a multi-order register, a tens carry mechanism associated with said register and capable of operation to operate the highest order register wheel from "0" to "9" position if in a subtracting operation the register becomes overdrawn, and having also an amount indexing mechanism, and wherein in such machine indexed amounts are adapted to be run in an adding direction into said register during an adding phase, wherein further indexed amounts are adapted to be run in a subtracting direction out of the register during a subtraction phase and wherein further amounts contained in the register, whether of positive or negative nature, are adapted to be run out of the register in said subtraction direction in a subtraction phase by rotation of the wheels to zero positions, the combination therein with said indexing mechanism and said highest order wheel, (a) of a dual-purpose total and subtract key, (b) means controlled by said key if said indexing mechanism has been indexed to cause an operation of said machine cycling means in which the indexed amount is subtracted out of the register in a subtracting phase, and controlled by said key if said indexing mechanism has precedingly not been operated to subtract the amount contained in the register whether positive or negative, out of it, placing said register thereby in zero position, (c) an overdraft signal control member operable to an overdraft signifying position by rotation of said highest order wheel from "0" to "9" position, (d) and restoring means for said signal control member adapted to respond to said key only if said indexing mechanism is unindexed, ($d^1$) said last introduced means including means controlled by said indexing means, if operated, to incapacitate said restoring means.

5. The invention set forth in claim 4, said restoring means including a reciprocally actuated means which becomes incapacitated through operation of said indexing means.

6. In an adding machine having a machine cycling means, a multi-order register, a tens carry mechanism associated with said register and capable of operation to operate the highest order register wheel from "0" to "9" position if in a subtracting operation the register becomes overdrawn, and having also an amount indexing mechanism, and in which machine indexed amounts are adapted to be run in an adding direction into said register during an adding phase and wherein indexed amounts are adapted to be run in a subtracting direction out of the register during a subtraction phase and wherein further amounts contained in the register, whether of positive or negative nature, are adapted to be run out of the register in said subtraction direction in said subtraction phase by rotation of the wheels to zero positions, the combination therein with said indexing mechanism and said highest order wheel, (a) of a total key, (b) means controlled by said total key if said indexing mechanism has precedingly been operated to subtract the amount contained in the register, whether positive or negative, in a subtracting sense out of it, placing said register thereby in zero position, said amount indexing mechanism including, (c) a single set of digit keys, (d) a pin carriage movable from a lowest order to successively higher order indexing positions in response to successive operations of said digit keys, the pin carriage being adapted to be cycle restored to its lowest order indexing position by any operation of the cycling means, (e) an overdraft signal control member operable to an overdraft signifying condition by rotation of said highest order wheel from "0" to "9" position, (f) and restoring means for said signal control member adapted to respond to said key only if said pin carriage is in its lowest order position, (g) said restoring means including incapacitating means operable by the movement of the pin carriage from its lowest order position.

References Cited

UNITED STATES PATENTS

| | | | |
|---|---|---|---|
| 2,079,355 | 5/1937 | Lee | 235—60.2 |
| 2,744,681 | 5/1956 | Hall et al. | 235—60.2 X |
| 2,775,403 | 12/1956 | Hall et al. | 235—60.2 X |
| 2,677,499 | 5/1954 | Boyden et al. | 235—60.2 |
| 2,987,244 | 6/1961 | Schulz | 235—60.2 |

RICHARD B. WILKINSON, Primary Examiner
STANLEY A. WAU, Assistant Examiner

U.S. Cl. X.R.

235—60.2